(12) United States Patent
Stanwood et al.

(10) Patent No.: US 8,199,645 B2
(45) Date of Patent: Jun. 12, 2012

(54) SYSTEMS AND METHODS FOR INTELLIGENT DISCARD IN A COMMUNICATION NETWORK

(75) Inventors: Kenneth Stanwood, Vista, CA (US); David Gell, San Diego, CA (US)

(73) Assignee: Cygnus Broadband, Inc., San Diego, CA (US)

( * ) Notice: Subject to any disclaimer, the term of this patent is extended or adjusted under 35 U.S.C. 154(b) by 0 days.

(21) Appl. No.: 13/207,159

(22) Filed: Aug. 10, 2011

(65) Prior Publication Data

US 2011/0292796 A1 Dec. 1, 2011

Related U.S. Application Data

(63) Continuation of application No. 12/813,856, filed on Jun. 11, 2010, now Pat. No. 8,068,440.

(60) Provisional application No. 61/186,707, filed on Jun. 12, 2009, provisional application No. 61/187,113, filed on Jun. 15, 2009, provisional application No. 61/187,118, filed on Jun. 15, 2009.

(51) Int. Cl.
*H04W 28/08* (2009.01)

(52) U.S. Cl. ........ 370/230; 370/232; 370/235; 370/236; 370/327; 370/328; 370/338; 370/412; 455/11.1; 455/12.1; 455/13.1; 455/13.2; 455/13.3; 455/13.4; 455/426.1; 455/435.1; 455/448; 455/449; 455/453; 455/454

(58) Field of Classification Search .................. None
See application file for complete search history.

(56) References Cited

U.S. PATENT DOCUMENTS

| | | | |
|---|---|---|---|
| 6,219,339 B1 | 2/1998 | Doshi | |
| 6,747,991 B1 * | 6/2004 | Hemy et al. | 370/468 |
| 2004/0203832 A1 | 10/2004 | An | |
| 2005/0180351 A1 | 8/2005 | Peric | |
| 2006/0171480 A1 | 8/2006 | Erving et al. | |
| 2008/0126803 A1 | 5/2008 | Ginter et al. | |
| 2008/0291935 A1 * | 11/2008 | Campion et al. | 370/412 |
| 2009/0010350 A1 | 1/2009 | Lee et al. | |
| 2009/0147680 A1 * | 6/2009 | Liu | 370/232 |
| 2010/0216467 A1 | 8/2010 | Ryan et al. | |

OTHER PUBLICATIONS

R. Fielding et al., "Hypertext Transfer Protocol—HTTP/1.1", Network Working Group, Standards Track, Jun. 1999, 157 pages.
M. Baugher et al., "The Secure Real-time Transport Protocol (SRTP)", Network Working Group, RFC 3711, Standards Track, Mar. 2004, 57 pages.
John A. Bocharov et al., "Portable encoding of audio-video objects, The Protected Interoperable File Format (PIFF)", Microsoft Corporation, First Edition Sep. 8, 2009, Revised Mar. 9, 2010, 32 pages.

(Continued)

*Primary Examiner* — Ian N Moore
*Assistant Examiner* — Brian T Le
(74) *Attorney, Agent, or Firm* — Procopio, Cory, Hargreaves & Savitch LLP

(57) ABSTRACT

Systems and methods for optimizing system performance of capacity and spectrum constrained, multiple-access communication systems by selectively discarding packets are provided. The systems and methods provided herein can drive changes in the communication system using control responses. One such control responses includes the optimal discard (also referred to herein as "intelligent discard") of network packets under capacity constrained conditions. Some embodiments provide an interactive response by selectively discarding packets to enhance perceived and actual system throughput, other embodiments provide a reactive response by selectively discarding data packets based on their relative impact to service quality to mitigate oversubscription, others provide a proactive response by discarding packets based on predicted oversubscription, and others provide a combination thereof.

46 Claims, 7 Drawing Sheets

OTHER PUBLICATIONS

"Adobe Flash Video File Format Specification", Version 10.1, Aug. 2010, 89 pages.
"HTTP Dynamic Streaming on the Adobe Flash Platform", Adobe, Sep. 2010, 18 pages.
"Advanced Systems Format (ASF) Specification", Microsoft, Revision 01.20.05, Jun. 2010, 110 pages.
"Protocol Analysis of PPlive and PPstream by Internet Measurement", Yunfei Zhang, China Mobile, Mar. 23, 2009, 13 pages.
http://wiki.theory.org/BitTorrentSpecification, last modified Jun. 7, 2011, 25 pages.
R. Pantos et al., "HTTP Live Streaming draft-pantos-http-live-streaming-05", Apple Inc., IETF draft, Nov. 19, 2010, 23 sheets.
"[MS-SMTH]: IIS Smooth Streaming Transport Protocol", Microsoft Corporation, Sep. 8, 2009, 55 pages.
"Flash Media Manifest File Format Specification", OSMF.org, Jun. 28, 2010, version 1.01, http://osmf.org/dev/osmf/specpdfs/FlashMediaManifestFileFormatSpecification.pdf, 5 pages.
"PSS: Progressive Download and Dynamic Adaptive Streaming over HTTP (3GP-DASH)", 3GPP Release 10, TS 26.247 V10.1.0, Nov. 2010, 92 pages.
"Dynamic adaptive streaming over HTTP (DASH)", MPEG System Technologies, Part 6, ISO/IEC (FCD) 23001-6, Jan. 28, 2011, 86 pages.
"Information technology—Coding of audio visual objects—Part 12: ISO base media file format, Amendment 3: DASH support and RTP reception hint track processing", ISO/IEC 14496-12, Jan. 28, 2011, 43 pages.
Thomas Stockhammer, "Dynamic Adaptive Streaming over HTTP—Design Principles and Standards", Qualcomm Incorporated, accessed on Aug. 11, 2011, 3 pages.
ITU-R Rec. BT.500-12, "Methodology for the subjective assessment of the quality of television pictures", BT Series, Broadcasting service (television), Sep. 2009, 46 pages.
Series P: Telephone Transmission Quality, Telephone Installations, Local Line Networks, Audiovisual quality in multimedia services, "Subjective video quality assessment methods for multimedia applications", ITU-T Rec. P.910, Apr. 2008, 42 pages.
ANSI T1.801.03-2003, "American National Standard for Telecommunications—Digital Transport of One-Way Video Signals—Parameters for Objective Performance Assessment."
Series J: Cable Networks and Transmission of Television, Sound Programme and Other Multimedia Signals, "Objective perceptual video quality measurement techniques for digital cable television in the presence of a full reference", ITU-T Rec. J.144, Mar. 2004, 156 pages.
"ITS Video Quality Research" Video Quality Metric (VQM) website, http://www.its.bldrdoc.gov/n3/video/standards/index.php, accessed Aug. 3, 2011, 3 pages.
Series J: Cable Networks and Transmission of Television, Sound Programme and Other Multimedia Signals, Measurement of the quality of service, "Perceptual audiovisual quality measurement techniques for multimedia services over digital cable television networks in the presence of a reduced bandwidth reference", ITU-T Rec. J.246, Aug. 2008, 42 pages.
Series J: Cable Networks and Transmission of Television, Sound Programme and Other Multimedia Signals, Measurement of the quality of service, "Objective perceptual multimedia video quality measurement in the presence of a full reference", ITU-T Rec. J.247, Aug. 2008, 108 pages.
Mylène C. Q. Farias, "Video Quality Metrics", Department of Computer Science, University of Brasilia (UnB), Brazil, Feb. 2010, 30 pages.
Z. Wang et al., "Image quality assessment: From error visibility to structural similarity", IEEE Transactions on Image Processing, vol. 13, No. 4, Apr. 2004, 14 pages.
"Cisco ASR 5000 Multimedia Core Platform", Cisco datasheet, Cisco Systems, Inc., 2010, 4 pages.
V. Vukadinovic, "Mobility and opportunistic resource allocation in wireless multimedia networks", Doctoral Thesis, Stockholm, Sweden, 2010, 46 pages.
F. Qian et al., "Characterizing Radio Resource Allocation for 3G Networks", Nov. 2010, 14 pages.
S. Kumar et al., "Error Resiliency Schemes in H.264/AVC Standard", Elsevier Inc., Aug. 24, 2005, 26 pages.
Nanying Yin, San-Qi Li, and Thomas E. Stern, "Congestion Control for Packet Voice by Selective Packet Discarding," IEEE Trans. on Communications, May 1990, vol. 38, No. 5, Abstract, 1 page.
Kotikalapudi Sriram, R. Scott McKinney, and Mostafa Hashem Sherif, "Voice Packetization and Compression in Broadband ATM Networks," IEEE Journal on Selected Areas in Communications, vol. 9, No. 3, Apr. 1991, Abstract, 1 page.
David W. Petr, Luiz A DaSilva, Jr., Victor S. Frost, "Priority Discarding of Speech in Integrated Packet Networks," IEEE Journal on Selected Areas in Communications, vol. 7, No. 5, Jun. 1989, Abstract, 1 page.
International Search Report and Written Opinion issued Feb. 1, 2011 in PCT/US2010/038357, 13 pages.

* cited by examiner

SYSTEMS AND METHODS FOR INTELLIGENT DISCARD IN A COMMUNICATION NETWORK

RELATED APPLICATIONS

This application is a continuation of U.S. patent application Ser. No. 12/813,856, titled "Systems and Methods for Intelligent Discard in a Communication Network," filed Jun. 11, 2010, which claims the benefit of U.S. provisional patent application Ser. No. 61/186,707 entitled "System and Method for Interactive Intelligent Discard in a Communication Network," filed on Jun. 12, 2009, U.S. provisional patent application Ser. No. 61/187,113 entitled "System and Method for Interactive Intelligent Discard in a Communication Network," filed on Jun. 15, 2009, and U.S. provisional patent application Ser. No. 61/187,118 entitled "System And Method For Proactive Intelligent Discard In A Communication Network," filed on Jun. 15, 2009, all of which are incorporated herein by reference in their entirety.

FIELD OF THE INVENTION

The present invention generally relates to the field of communication systems and more specifically to systems and methods for optimizing system performance by selectively discarding packets in capacity and spectrum constrained, multiple-access communication systems.

BACKGROUND

In capacity and spectrum constrained, multiple-access communication system, two goals are omnipresent: the successful transfer of information, and the minimization of such transmissions from disrupting other transfers. Often these goals are in conflict with each other, and thus represent opportunity for system optimization.

In a cellular network, for example, the creation of a positive user experience is the success criteria for the transport of information. Often this metric is further defined as the quality of service of a particular user task or application. In contrast, this activity can be viewed by its effect on other network users, specifically through the usage of limited system resources and through the creation of channel interference.

SUMMARY

Systems and methods for optimizing system performance of capacity and spectrum constrained, multiple-access communication systems by selectively discarding packets are provided. The systems and methods provided herein can drive changes in the communication system using control responses. One such control response includes the optimal discard (also referred to herein as "intelligent discard") of network packets under capacity constrained conditions. Some embodiments provide an interactive response by selectively discarding packets to enhance perceived and actual system throughput. Other embodiments provide a reactive response by selectively discarding data packets based on their relative impact to service quality to mitigate oversubscription where the demand for bandwidth exceeds the available bandwidth. Additional embodiments provide a proactive response by discarding packets based on predicted oversubscription. Other embodiments provide a combination of these techniques to decrease oversubscription.

According to another embodiment, a multivariate control system for mitigating the effects of various interference scenarios in a capacity and spectrum constrained, multiple-access communication network is provided. The control system includes a policy parameters module, an environment parameters module, a control set points module, a real-time profile module, an assessment module, and a control response module. The policy parameters module is configured to receive policy parameters that define operational requirements for the communication network. The environment parameters module is configured to receive environment parameters that represent real-time information describing the operating status of the communication network. The control set points module is in communication with the policy parameters module and is configured to receive policy parameters from the policy parameters module and to generate a set of control set points that can be used to assess whether current operating status of the communication network meets the operational requirements defined in the policy parameters. The real-time profile module in communication with the environment parameters module and is configured to receive environment parameters from the environment parameters module and to generate a real-time profile of the communication network that represents current operating conditions of the communication network. The assessment module is in communication with the real-time profile module and the control set point module and is configured to receive the real-time profile from the real-time profile module and the set of control set points from the control set point module, to determine whether the current operating conditions of the communication network meet the operational requirements in the policy parameters, and to generate feedback signals indicating that the current operating conditions of the communication network do not meet the operational requirement. The control response module is in communication with the assessment module and is configured to receive feedback signals from the assessment module and to generate control signals for one or more components of the communication system to adjust the operating parameters of the one or more components of the communication system.

According to an embodiment, a method for mitigating the effects of various interference scenarios in a capacity and spectrum constrained, multiple-access communication network is provided. The method includes obtaining environment inputs comprising real-time information describing the operating status of the communication network, deriving a real-time profile of the network based on the environment inputs, the real-time profile representing current operating conditions of the communication network, determining whether the real-time profile satisfies a set of control set points, the control set points representing operational requirements for the communication network based on policy parameters, generating a feedback adjustment signal if the real-time profile does not satisfy at least one control set point, generating control signals based on the feedback adjustment signal for one or more components of the communication system to adjust the operating parameters of the one or more components of the communication system.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
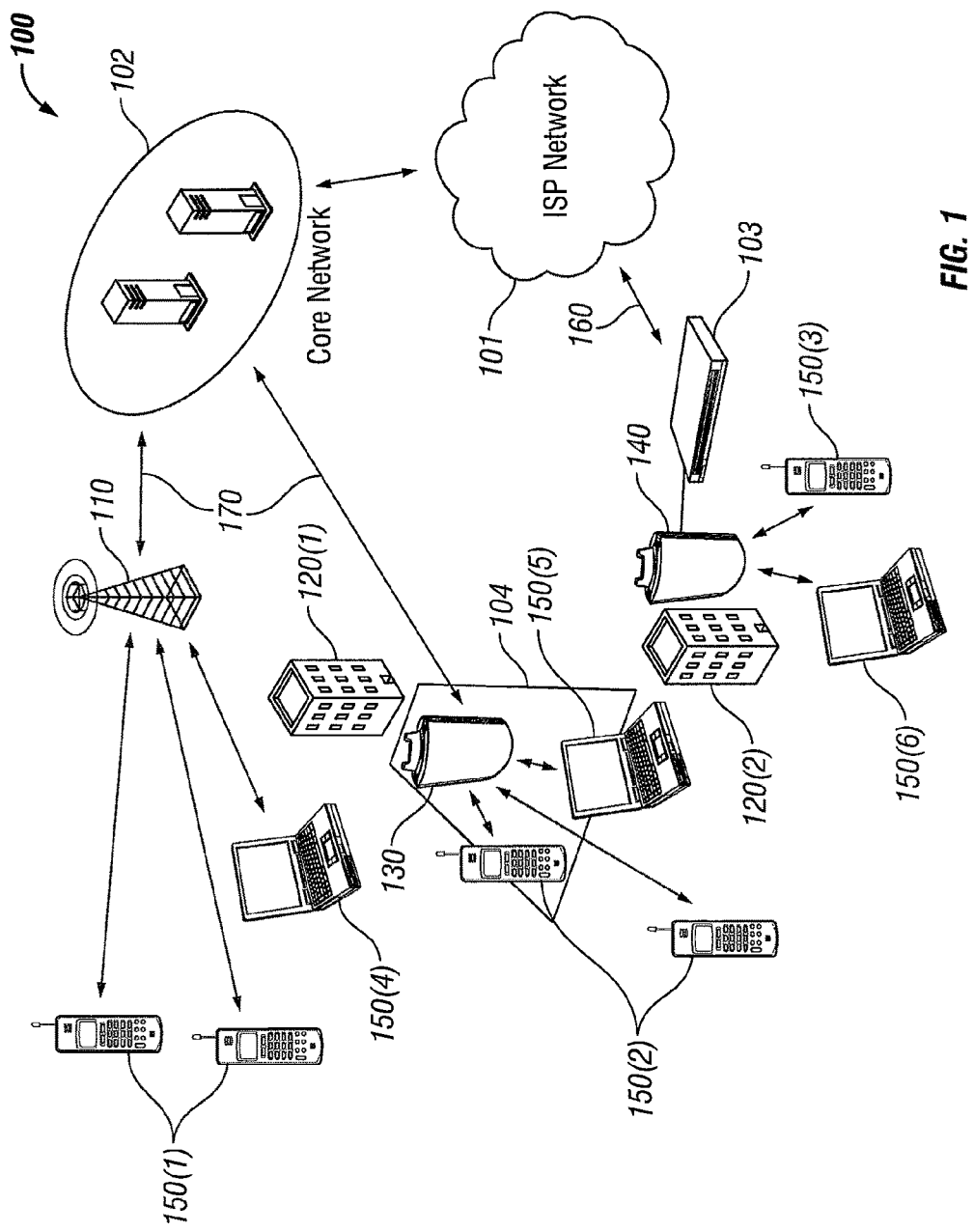
FIG. 1 is a block diagram of a wireless communication network in which the systems and methods disclosed herein can be implemented according to an embodiment.

Some embodiments provide systems and methods for a multivariate control system that can be implemented in a base station. The control system can be configured to for mitigating the effects of various interference scenarios in a capacity and spectrum constrained, multiple-access communication network. In other embodiments, the control system can be configured for making adjustments to or changing the overall bandwidth demands. The systems and methods provided herein can drive changes in the communication system using control responses. One such control responses includes the optimal discard (also referred to herein as "intelligent discard") of network packets under capacity constrained conditions. Some embodiments provide an interactive response by selectively discarding packets to enhance perceived and actual system throughput, other embodiments provide a reactive response by selectively discarding data packets based on their relative impact to service quality to mitigate oversubscription, others provide a proactive response by discarding packets based on predicted oversubscription, and others provide a combination thereof.

According to an embodiment, an interactive response technique is provided that allows transmission and radio access network (RAN)/radio frequency (RF) parameters to be optimized for robustness against interference from neighboring cells and optimized for mitigation of interference to neighboring cells. These optimizations are performed by determining and considering throughput levels and associated quality scores for a set of active services. A high quality user experience can be maintained where perceived and actual system throughput is controlled by selectively discarding packets.

According to an embodiment, a reactive response technique is provided that allows selected data packets to be discarded based on their relative impact to service quality in order to mitigate oversubscription caused by modification of transmission parameters or by varying the RAN/RF parameters to mitigate interference between neighboring cells. Reactively discarding packets in reaction to varying available bandwidth can provide an increase in perceived quality of the user experience for a given amount of bandwidth and can provide an increase in the number of services that can be maintained for a given amount of bandwidth.

According to an embodiment, a proactive response technique is provided that can improve the quality of the user experience and system throughput by predicting oversubscription and selectively discarding packets or marking packets for efficient discard prior to anticipated oversubscription. Proactively discarding packets in reaction to anticipated oversubscription can provide an increase in perceived quality of the user experience for a given amount of bandwidth and can provide an increase in the number of services that can be maintained for a given amount of bandwidth and for a given amount of change in bandwidth. In an embodiment, selectively proactively discarding packets can be used to optimize transmission and RAN/RF parameters to increase robustness against interference from neighboring cells and to mitigate interference to neighboring cells in anticipation of events which cause a need for such parameter changes. Proactively applying intelligent discard and considering intelligent discard to proactively modify transmission and RAN/RF parameters before a bandwidth limiting event occurs can provide a better user experience transition than can be achieved by waiting to apply intelligent discard and to modify transmission and RAN/RF parameters until after such a bandwidth limiting event.

Some embodiments provide systems and methods for a multivariate control system that can be implemented in a base station. The control system can be configured to mitigate the effects of various interference scenarios in a capacity and spectrum constrained, multiple-access communication network. In other embodiments, the control system can be configured for making adjustments to or changing the overall bandwidth demands.

The systems and methods disclosed herein can be applied to various capacity-limited communication systems, including but not limited to wireline and wireless technologies. For example, the systems and methods disclosed herein can be used with Cellular 2G, 3G, 4G (including Long Term Evolution ("LTE"), LTE Advanced, WiMax), WiFi, Ultra Mobile Broadband ("UMB"), cable modem, and other wireline or wireless technologies. Although the phrases and terms used herein to describe specific embodiments can be applied to a particular technology or standard, the systems and methods described herein are not limited to the these specific standards.

Although the phrases and terms used to describe specific embodiments may apply to a particular technology or standard, the methods described remain applicable across all technologies.

According to an embodiment, the systems and methods disclosed herein, including intelligent discard of packets, can be practiced within any entity within the communications system that performs scheduling. This includes the scheduling of downlink bandwidth by any form of base station, including macrocell, picocell, enterprise femtocell, residential femtocell, relays, or any other form of base station. According to an embodiment, intelligent discard can be performed by any form of device which transmits in the uplink direction including user devices, both fixed and mobile, and relay devices. According to an embodiment, intelligent discard can be performed by a scheduling algorithm, housed in the core network which centrally directs the actions of devices. According to an embodiment, intelligent discard can be predictively performed by an entity such as a base station that allocates uplink bandwidth for use by another entity, such as a user device known to be capable of intelligent discard. The base station and the user device can negotiate whether or not the user device has intelligent discard capability, or in some embodiments, whether the user device has intelligent discard capability can be determined based on the model identification of the user device.

Basic Deployments

FIG. 1 is a block diagram of a wireless communication network in which the systems and methods disclosed herein can be implemented according to an embodiment. FIG. 1 illustrates a typical basic deployment of a communication system that includes macrocells, picocells, and enterprise femtocells. In a typical deployment, the macrocells can transmit and receive on one or many frequency channels that are separate from the one or many frequency channels used by the small form factor (SFF) base stations (including picocells and enterprise or residential femtocells). In other embodiments, the macrocells and the SFF base stations can share the same frequency channels. Various combinations of geography and channel availability can create a variety of interference scenarios that can impact the throughput of the communications system.

FIG. 1 illustrates a typical picocell and enterprise femtocell deployment in a communications network 100. Macro base station 110 is connected to a core network 102 through a standard backhaul 170. Subscriber stations 150(1) and 150(4) can connect to the network through macro base station 110. In the network configuration illustrated in FIG. 1, office building 120(1) causes a coverage shadow 104. Pico station 130, which can be connected to core network 102 via standard backhaul 170, can provide coverage to subscriber stations 150(2) and 150(5) in coverage shadow 104.

In office building 120(2), enterprise femtocell 140 provides in-building coverage to subscriber stations 150(3) and 150(6). Enterprise femtocell 140 can connect to core network 102 via ISP network 101 by utilizing broadband connection 160 provided by enterprise gateway 103.

Figure 2A:
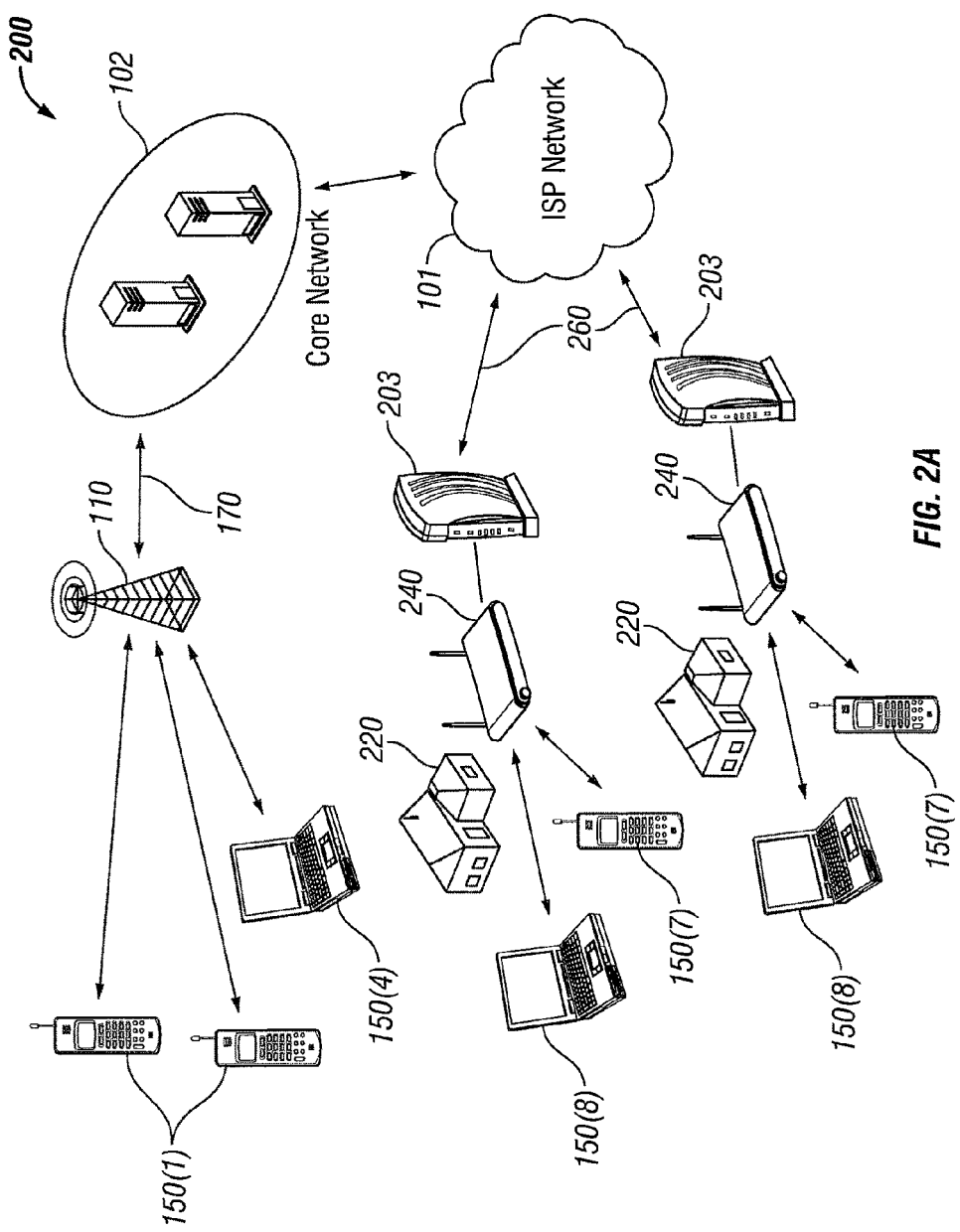
FIG. 2A is block diagram of another wireless communication network in which the systems and methods disclosed herein can be implemented according to an embodiment.

FIG. 2A is a block diagram of another wireless communication network in which the system and methods disclosed herein can be implemented according to an embodiment. FIG. 2A illustrates a typical basic deployment in a communications network 200 that includes macrocells and residential femtocells deployed in a residential environment. Macrocell base station 110 can be connected to core network 102 through standard backhaul 170. Subscriber stations 150(1) and 150(4) can connect to the network through macro base station 110. Inside residences 220, residential femtocell 240 can provide in-home coverage to subscriber stations 150(7) and 150(8). Residential femtocells 240 can connect to core network 102 via ISP network 101 by utilizing broadband connection 260 provided by cable modem or DSL modem 203.

Figure 2B:
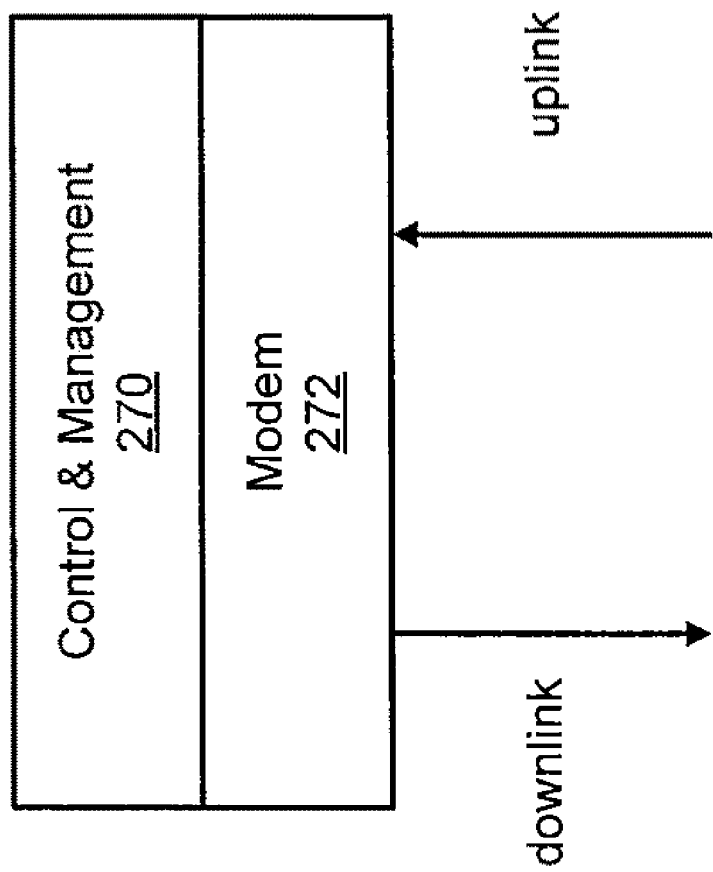
FIG. 2B is a block diagram of an access point or base station that can be used to implement the systems and methods illustrated in FIGS. 3-6 according to an embodiment.

FIG. 2B is a high level block diagram of an access point or base station. The base station includes a modem section 272 which transmits and receives wireless signals. The modem can also measure and determine various characteristics of the received signals. The control and management section 270 was generally responsible for the operation of the base station. In some embodiments described herein, the control and management section 270 implements the system and method described herein in connection with FIGS. 3-6.

Interference Scenarios

Various interference scenarios can result in decreases in perceived and actual performance of the communications network. For example, the 3rd Generation Partnership Project (3GPP) has identified a number of interference scenarios in a technical report (3GPP TR 25.967), which is hereby incorporated by reference in its entirety. Some examples of interference scenarios include: (1) Uplink (UL) transmission from subscriber station to SFF base station interfering with UL of macrocell base station; (2) Downlink (DL) transmission of SFF base station interfering with macrocell base station DL; (3) UL transmission from subscriber station to macrocell base station interfering with SFF base station uplink; (4) DL transmission of macro base station interfering with SFF base station DL; (5) UL transmission from subscriber station to SFF base station interfering with UL of SFF station; (6) DL transmission of SFF base station interfering with SFF base station DL; and (7) interference to and from systems of other technologies.

Avoidance and Mitigation Techniques

Figure 3:
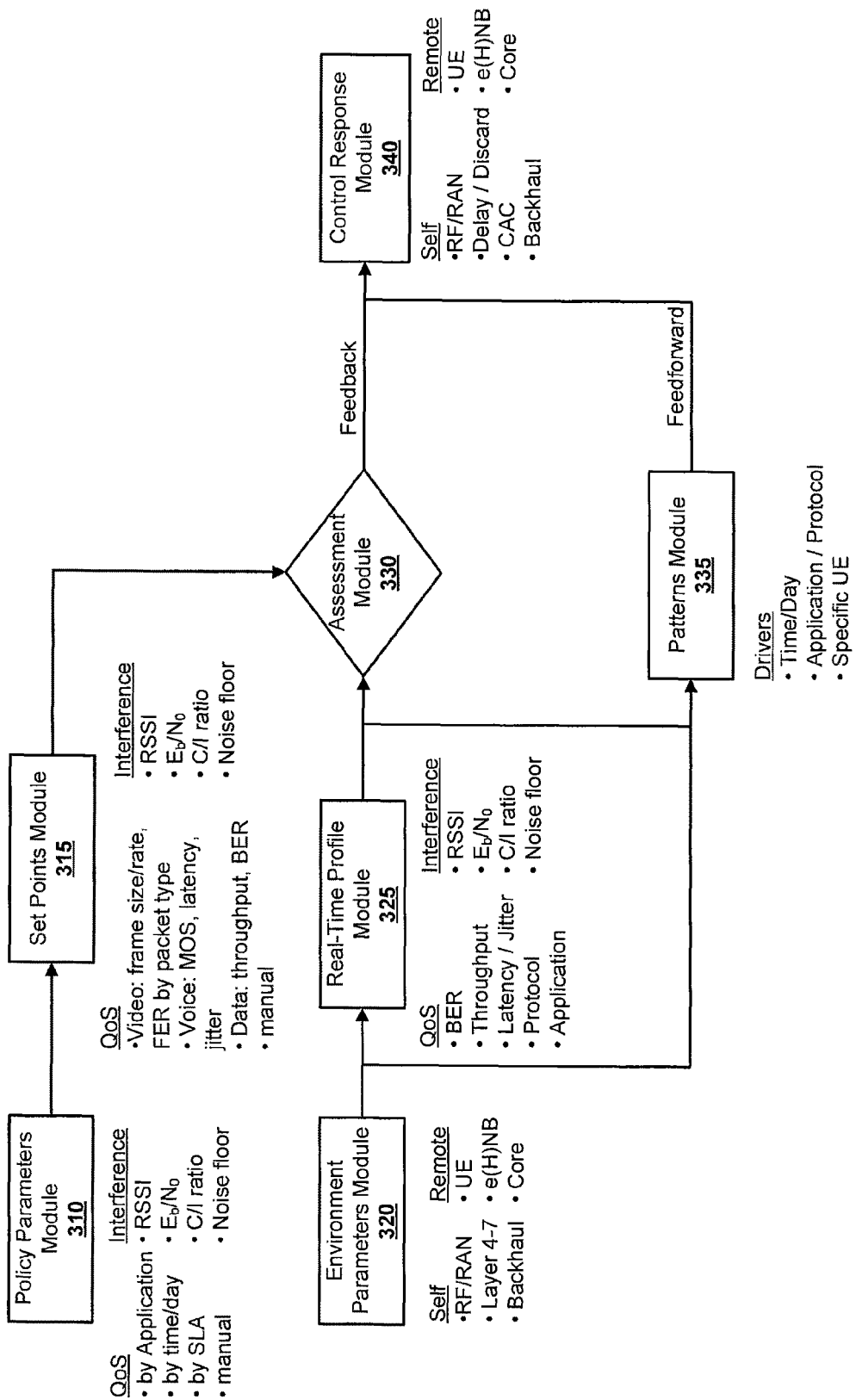
FIG. 3 is a logical block diagram of a system for mitigating effects of interference scenarios in a wireless communication network according to an embodiment.

FIG. 3 is a logical block diagram illustrating an example of the functional elements of a multivariate control system for mitigating the effects of various interference scenarios in a capacity and spectrum constrained, multiple-access communication network, such as those described above, according to an embodiment. The functionality of the system is show in FIG. 3 broken down into modules to more clearly illustrate the functionality of the control system. The control system can be implemented in a macrocell base station, picocell, or femtocell, such as macrocell base station 110, pico station 130, and residential femtocell 240 illustrated in FIGS. 1 and 2. Alternatively, portions can be distributed to a base station controller (BSC) or other element of core network 102.

In an embodiment, the control system can be configured to provide optimal responses in the following areas: (1) interference avoidance and (2) interference mitigation. The control system can avoid radio frequency (RF) interface through optimal control of RF/RAN parameters. The control system can also preserve packet quality of service ("QoS") when interference cannot be avoided or when interference avoidance or mitigation result in decreased bandwidth availability.

According to an embodiment, various types of input parameters can be used by the control system. In an embodiment, these input parameters can be divided into policy parameters and environment parameters. Policy parameters module 310 can be configured to receive policy parameters, and environment parameter module 320 can be configured to receive environment parameters. The policy parameters received by policy parameters module 310 are operational requirements defined by, for example, the network provider. These policy parameters can be broken down into two groups of system requirements: QoS policies and interference policies. In an embodiment, the policy parameters can include QoS policies at an application level, by time/day, by service level agreement (SLA), manually define QoS parameters, or a combination thereof The policy parameters can also include policies related to various interference related parameters, such as received signal strength indicator (RSSI), energy per bit to noise power spectral density ratio ($E_b/N_0$), carrier-to-interference ratio (C/I), noise floor (the measure of the signal created from the sum of all of the noise source and unwanted signals), or other interference related parameters. The control system can use the policy parameters to determine the types of actions that can undertaken to avoid interference and to mitigate interference when interference cannot be avoided.

The environment input parameters received by environment parameter module 320 comprise real-time information that describes the operating status of the RF network and system environment. This information can be obtained at a base station (e.g., a macrocell, picocell, or femtocell as depicted in FIGS. 1 and 2) or reported by a subscriber station and can also include information about neighboring cells. The environment input parameters 320 can be further divided into two categories of input parameters: self environment parameters and remote environment parameters. The self environment parameters are environment parameters related to or obtained by the station in which the control system is implemented. For example, in one embodiment, the self environment parameters can include Layer 1-7 parameters of both the RF and backhaul femtocell or picocell ports. Remote environment parameters are related to or obtained from other cells and/or user equipment operating nearby the base station that can have an impact on the operating environment of the base station. For example, in an embodiment, the remote environment parameters can include Layer 1-7 parameters of the user equipment (UE), Core Network and other neighboring cells defined by base stations, such as evolved Node B (eNB or eNodeB), and pico stations and femtocells, such as evolved Home Node B devices (eHNB or Home eNodeB), collectively e(H)NB devices.

From the policy parameters and environment parameters, additional sets of parameters can be derived including control set points, real-time profile, and patterns. Control set points module 315 is configured to derive control set points from the policy inputs received by the policy parameters module 310 from the network provider or can be derived manually. The control set points comprise quantitative parameters that can be used as control loop target values. These quantitative parameters can be divided into QoS parameters and interference parameters. Some examples of QoS parameters include frame size and frame rate, and frame error rate (FER) by packet type for video content. Some additional examples of QoS parameters include mean opinion score ("MOS"), latency, and jitter for voice content. Additional examples of QoS parameters are throughput and bit error rate (BER) for data content. The interference related parameters can include, but are not limited to, various interference related parameters, such as received signal strength indicator (RSSI), energy per bit to noise power spectral density ratio ($E_b/N_0$), carrier-to-interference ratio (C/I), and noise floor (the measure of the signal created from the sum of all of the noise source and unwanted signals). The control set points can be used by assessment module 330 of the control system to assess the current state of the communication network based on a real-time profile 325 of the RF network and system environment and to determine whether to feedback signals should be generated to adjust the operating state of the network.

The real-time profile module 325 is configured to generate a real-time profile of the communication system based on the environment input parameters received by environment parameter module 320. In an embodiment, the real-time profile comprises quantitative parameters that reflect current operating conditions of the communication network. The real-time profile can comprise QoS and interference related parameters. Some examples of QoS-related parameters include BER, throughput, latency/jitter, protocol-related parameters, and application-related parameters. The interference related parameters can include, but are not limited to, various interference related parameters, such as received signal strength indicator (RSSI), energy per bit to noise power spectral density ratio ($E_b/N_0$), carrier-to-interference ratio (C/I), and noise floor (the measure of the signal created from the sum of all of the noise source and unwanted signals). According to an embodiment, the real-time profile can comprise a datagram, spreadsheet, or other representation of the current operating conditions of the communication network.

Patterns module 335 is configured to generate patterns that comprise a set of historical quantitative parameter patterns that can be used to generate feedforward control responses. The patterns can be derived from the environment parameters received by environment parameter module 320 and the real-time profile generated by real-time profile module 325. These patterns can reflect usage patterns on the network. For example, in an embodiment, the patterns can include specific drivers related to the date and/or time, a specific application or protocol, and/or a specific UE.

The control set points generated by control set points module 315 and the real-time profile generated by real-time profile module 325 can be assessed by assessment module 330 to compare the current operating parameters of the communication network represented in the real-time profile with the control set points to determine whether current operating conditions of the network meet the operational requirements included in the policy parameters. If the current operating conditions of the network do not meet the requirements set forth in the policy parameters, the assessment module 330 can generate feedback signals indicating that operating parameters of the communication system need to be adjusted.

The control response module 340 is configured to receive the feedback signals from the assessment module 330. The control response module 340 (also referred to herein as an optimization module) is configured to optimize the operating parameters of the communication network in an attempt to meet the requirements of the operator policy. The control response module 340 can be configured to generate control signals based on the feedback signals received from the assessment module 330. The control signals fall into two categories: "self" and "remote." Self control signals can be applied to the base station itself (the e(H)NB) to change the operating parameters of the base station and remote control signals can be applied to remote devices or components network, including UEs, the Core Network, and other e(H)NB to change the operating parameters of the remote devices or components of the network.

Figure 4:
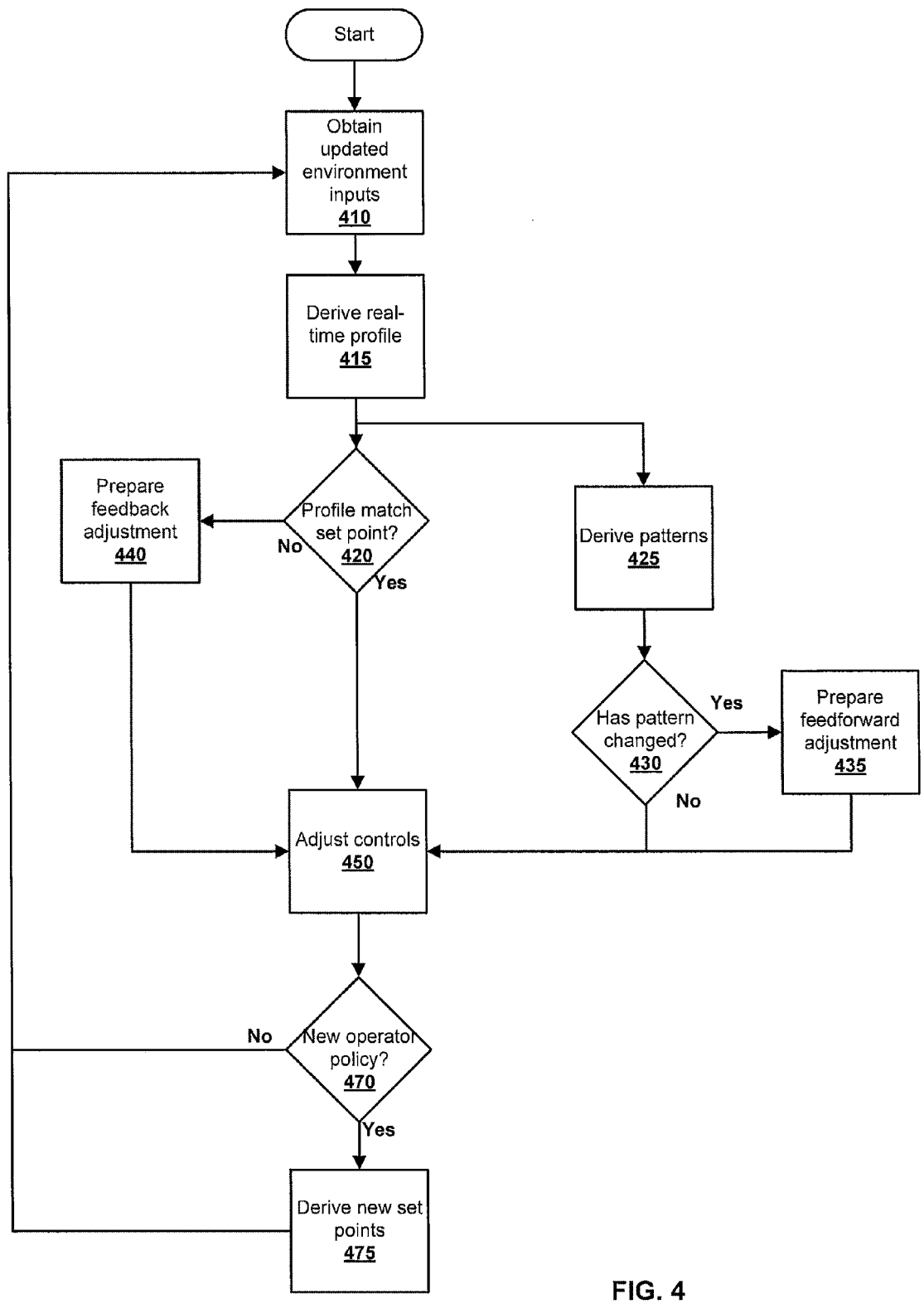
FIG. 4 is a flow diagram of a method that can be used to generate the feedforward and feedback adjustments of the radio frequency (RF) network and system environment using the system illustrated in FIG. 3 according to an embodiment.

FIG. 4 is a flow diagram of a method that can be used to generate the feedforward and feedback adjustments of the RF network and system environment using the system illustrated in FIG. 3 according to an embodiment. Updated environment inputs are obtained that represent the current state or new current state of the RF network and system environment (step 410). The environment inputs correspond to the environment parameters generated by environment parameter module 320 of the communication system. As described above, the environment parameters can comprise real-time information related to the RF network and system environment obtained from both the picocell or femtocell, subscriber stations, and neighboring cells including macrocells, picocells, and femtocells. A real-time profile is also derived from the updated environment inputs (step 415). In an embodiment, the real-time profile corresponds to real-time profile generated by real-time profile module 325 and can be generated from the environment input parameters obtained in step 410.

A determination can be made whether the real-time profile matches the set points generated by control set point module 315 (step 420). As described above, the control set points comprise quantitative parameters that can be used as control loop target values. The control set points can be derived from the policy parameters defined by the network provider. If the real-time profile does not match the set points, the real-time information collected related to the RF network and the system environment indicates that the operating state of the network has deviated from the set points that were derived from the network provider's operator policy. In response, the feedback adjustment control signals can be generated (step 440) to steer the communications network toward an operating state that is consistent with the policy parameters.

Patterns module 335 can derive patterns from the real-time profile and environment input parameters (step 425). In an embodiment, the patterns comprise a set of historical quantitative parameter patterns. A determination is made whether a pattern has changed (step 430), and if a pattern has changed, the historical quantitative parameter patterns that can be used to generate feedforward control responses (step 435) that can be used to adjust various operating parameters that can be used to steer the communication network toward a desired state.

The feedback signals generated in step 440 and the feedforward signals generated in step 435 can be used to generate a set of control signals (step 450) that can be applied to the 'self' e(H)NB and remote devices, including UEs, the Core Network and other e(H)NB.

A determination is made whether the network provider has made changes to the operator policy (step 470). If the network operator has made changes to the policy parameters, new set points can be generated by the control set points module 315 from the operator policy (step 475) before returning to step 410. Otherwise, the method returns to step 410 where the environment inputs are collected.

Inputs

The SFF base station can have access to various environmental information that can be used in generating feedback and feedforward signals for the control response module 340. This information can be part of the environment parameters 320 that can be used to generate the real-time profile generated by real-time profile module 325 and the patterns generated by patterns module 335. The information can be collected by the SFF base station during step 410 of the method illustrated in FIG. 4. For example; according to an embodiment, the following environmental input data is typically available (sensed, reported to, etc.) to an SFF base station: (1) signal strength from macro BTS(s), (2) signal strength from other SFF base station(s), (3) knowledge of whether the macro base stations and the SFF base stations are co-channel (or adjacent channel); (4) neighboring cell identification data; and (5) macro network specific information and system parameter thresholds. Some examples of additional information that can be available to an SFF base station include: DL co-channel carrier RSSI, DL adjacent channel carrier RSSI, common pilot channel (CPICH) Energy per Chip to Total Noise Power (Ec/No), received total wideband power (RTWP), public land mobile network (PLMN) ID, cell ID, Local Area Code (LAC), Routing Area Code (RAC), scrambling codes, co-channel CPICH received signal code power (RSCP), adjacent channel CPICH RSCP, P-CPICH Tx Power, macro cell data rate and macro cell dead-zone coverage. The macro cell data rate and macro cell dead-zone coverage can take into account various information, including macro station load, the number of active SFF base stations, distance of the SFF base stations to the macro station, fading environment, and time-of-day. The SFF base station can have macro station parameter information available to the SFF base station, including target SNR, measured SNR, and received power.

Adjustments

The following item are some examples of the type of parameters that can be adjusted in step 450 by an SFF base station in response to the environment information received via sensing: (1) DL power, (2) UL noise rise target (UL scheduler), (3) UL power, (4) control channel/data channel power ratio, (5) receiver gain, (6) carrier frequency, (7) DL scrambling code, (8) LAC, and (9) RAC.

Additional Inputs

The SFF base station can have access to additional input information. This information can be part of the environment parameters 320 that can be used to generate the real-time profile 325 and patterns 335. The information can be collected by the SFF base station during step 410 of the method illustrated in FIG. 4. For example, additional inputs such as real-time traffic metrics can also be available to an SFF base station and can be used to generate the real time profile 325. For example, real-time traffic metrics, such as the number of active UEs, the number of idle UEs, indicators of UE mobility and changes in position, the aggregate UL usage, the aggregate DL usage, the Layer 4-7 profile (Voice, video, web, FTP, etc.), the backhaul capacity, and the per connection BER. The per connection BER data can be obtained before hybrid automatic repeat request (HARQ) or other retry mechanisms or after HARQ or other retry mechanisms. In some embodiments, the per-connection BER can be obtained without HARQ. In some embodiments, the per-connection BER data can include statistics on retries.

Historical pattern data (such as patterns 335) can also be available to the SFF base station, such as time of day data, day of week data, local holiday data, known/unknown UE entering the network, typical usage rates, and typical usage durations. This historical data can be used to generate patterns 335, which can be used to generate feedforward control signals as described above.

Policy input data can also be available to the SFF base station, such as QoS requirements data, priorities data, packet inspection data, and advanced antenna inputs. This policy information can be part of the operator policy data 310 described above. The QoS requirements data can include delay tolerance data jitter tolerance data, BER/PER tolerance data, minimum acceptance rate data, and/or other QoS related data. The priority input data can include data related to priorities between users, between classes of service, between connections, and/or between packets from the same class of service. Packet inspection data and advanced antenna inputs data can also be available to the SFF base station.

Additional Parameters Adjusted

Additional parameters can be adjusted in step 450 in an attempt to remedy oversubscription. In one embodiment, RAN/RF parameters, such as modulation and coding, sub-channelization, time within frame, subchannel and time hopping, multiple-input multiple-output (MIMO) parameters, and beamforming can be used to remedy oversubscription on the communication system. In another embodiment, traffic policing can be used to remedy oversubscription. Various types of types of traffic policing can be used, including rate limiting, packet blocking, packet dropping and/or intelligent discard. Various techniques for intelligent discard that can be used to remedy oversubscription are described below.

Optimizing Performance

According to an embodiment, the described systems and methods include an optimization module to optimize performance by varying extended RAN/RF parameters based on QoS, priority, and policy (also referred to herein as the "optimization module"). According to an embodiment, the optimization module can be implemented in a base station, including a macrocell, picocell, or femtocell base station.

In one embodiment, the optimization module is configured to establish the BER/PER or other quality metric level for each class of service (CoS) or connection. In one embodiment, the quality metric can be prioritized based on known/unknown user equipment, where known user equipment can be given priority over unknown user equipment. The user equipment can include mobile, transient, and stationary subscriber stations. In another embodiment, the quality metric can be prioritized based on specific UE identity, and in yet another embodiment, the quality metric can be prioritized based on the application.

According to an embodiment, the optimization module is configured to establish required/desired throughput for each class of service or connection. The required/desired throughput can be optionally modified based on whether a UE is known or unknown, based on a specific UE identity, or based on a specific application.

According to an embodiment, the optimization module is configured to use a standards based approach to derive baseline interference scenario and baseline RAN/RF parameters.

According to an embodiment, the baseline interference scenario and baseline RAN/RF parameters can change in real-time as conditions change in the communications network. For example, some of the changing conditions include the number of active/inactive UEs, traffic in neighboring cells, and indicators of change in position of UE, such as round trip delay, RSSI, and tracking via receive beamforming.

According to an embodiment, optimization module can vary the actual scenario and actual RAN/RF parameters in real time as conditions change. For example, in one embodiment, if the BER or quality metric of service drops below a threshold, the required physical parameters of service can be set to be more robust than a baseline value. For example, MIMO can be changed and beamforming advanced antenna techniques can be applied. Furthermore, modulation and coding changes can be made to improve robustness. Alternatively, a determination can be made whether to exceed baseline interference scenarios and/or RAN/RF parameters. For example, the determination can be based on sensing data, permission from/negotiation with central controller, permission from/negotiation with neighboring BTSs, or use spatial multiplexing (beamforming, etc) to minimize interference. Alternatively, a subchannel and time location in frame (e.g., Orthogonal Frequency Division Multiplexing (OFDM) symbol, time slot, etc.) can be chosen to avoid regular interference. Alternatively, subchannels and time location in the frames can be randomized to statistically avoid interference or selectively increase potential caused interference, but mitigate through randomization of impact.

In an embodiment, if demand exceeds new maximum aggregate throughput (DL or UL, including bandwidth for managing active and idles UEs) then optimization module can take steps to mitigate the oversubscription. In one embodiment, delay tolerant traffic can be delayed to temporarily reduce demand. For example, one approach includes delaying and buffering content, such as a live video. Live video can be delayed and buffered so long as the variation in delay (jitter) remains within the capacity/time constraints of the delay/jitter buffer. In another embodiment, substantial deferral of "download for later use" content is used to decrease demand on the network. For example, in one embodiment, downloads of music and/or video content that is not being consumed as the content is received (e.g., non-streaming content) can be temporarily deferred until demand on the network decreases.

In another embodiment, if demand exceeds the new maximum aggregate throughput, optimization module can selectively discard frames within a service to reduce demand on the network. For example, some Moving Picture Experts Group (MPEG) frames are less important than others and can be selectively discarded in order to decrease demand on the communication system. In another example, packets having above a minimum acceptable rate for a service can be discarded to reduce demand.

In yet another embodiment, if demand exceeds the new maximum aggregate throughput, call admission control (CAC) can be used to curtail services. In some embodiments, services can be curtailed based on priority, while in some embodiments services can be curtailed based on the application.

According to an embodiment, the various mitigating actions taken if demand exceeds the new maximum aggregate throughput can be reversed when conditions improve. For example, in one embodiment, hysteresis can be used to smooth reactions.

Figure 5:
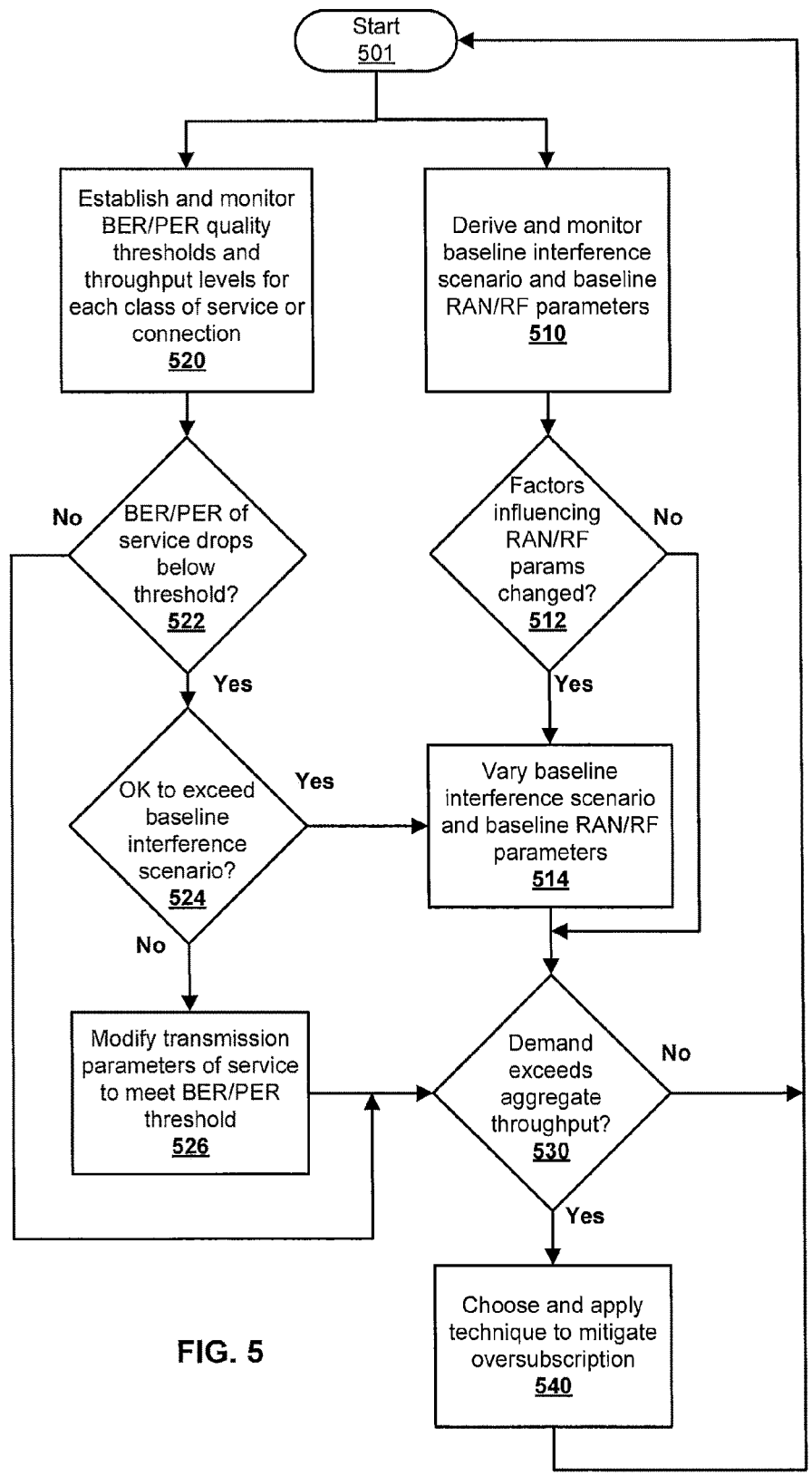
FIG. 5 is a flow diagram of a method for mitigating effects of interference scenarios in a wireless communication network according to an embodiment.

FIG. 5 is a flow chart illustrating a method that can be implemented by the optimization module described above to optimizing performance by varying extended RAN/RF parameters based on QoS, priority, and policy according to an embodiment. In an embodiment, the method illustrated in FIG. 5 can be implemented by the control system illustrated in FIG. 3. In an embodiment, the method of FIG. 5 can be implemented in step 450 of FIG. 4.

The method starts at step 501 where in parallel the method determines RAN/RF aspects of the system (steps 510, 512, and 514) and QoS and traffic management aspects of the system (steps 520, 522, 524, and 526).

In step 510, the baseline interference scenario is derived and monitored and baseline for RAF/RF parameter settings is created. In an embodiment, the inputs used to derive the baseline interference scenario can include typical inputs such as those suggested in the 3GPP TS 25.967, and additional inputs as suggested in this document, or both. The RAN/RF parameters adjusted can include typical inputs such as those suggested in the 3GPP TS 25.967, and additional RAN/RF parameters as suggested in this document, or a combination thereof In one embodiment, step 510 can be performed by the assessment module 330.

In step 512, a determination is made in real-time whether any of the factors influencing the interference scenario and the RAN/RF parameters that represent the current state of the RF network and the system environment have changed. If these factors have not changed, this parallel activity continues with the method proceeding to step 530. If the factors have changed, the method proceeds to step 514 where the baseline interference and RAN/RF parameters are modified to account for the observed changes, and the method proceeds to decision step 530. In one embodiment, step 512 can be performed by the assessment module 330, and step 514 can be performed by the control response module 340.

The process of managing the influence on classes of service and individual connections, and conversely, managing the influence of individual services and their associated class of service on the interface environment can be begun in parallel with step 510. In step 520, the maximum or target bit error rate (BER) or packet error rate (PER) (or other quality metric) is established for each class of service or each individual service or connection. Each individual service or connection's actual BER, PER, or other quality metric can be monitored. The maximum or target BER and PER values can be determined based on the operator policy information 310 provided by the network provider. Additionally, in step 520, the throughput needs or targets of the service can also be determined. These throughput targets can have multiple levels, corresponding to multiple levels of QoS that require differing levels of throughput. The throughput targets can also take into account expected retransmissions based on knowledge of the applications or the transport mechanisms used at the various layers of communication protocol. In one embodiment, step 520 can be performed by the control set point modules 315.

In step 522, a determination is made whether the actual error rates, such as the BER or PER, or other actual quality metric exceeds a target threshold for the connection determined in step 510. If the BER or other quality metric exceeds the threshold for the connection, the method proceeds to decision step 524 to start the process of taking corrective action. Otherwise, if the quality metric are no worse than the target, the method proceeds to decision step 530. In one embodiment, step 522 can be performed by the assessment module 330.

In step 524, a determination is made whether it is acceptable for the affected service provider to operate in a manner that can exceed the baseline interference scenario and baseline RAN/RF parameters, which could cause greater interference to services active in neighboring cells. For example, a temporary slight increase in transmission power (e.g., 0.5 dB) can add a tolerable increase in interference to services in neighboring cells. If it is acceptable for the affected service provider to operate in manner that can exceed the baseline interference scenario and baseline RAN/RF parameters, the method proceeds to step 514 where the baseline interference scenario and RAN/RF parameters can be temporarily adjusted to accommodate the need for improved QoS for the service. According to an embodiment, this adjustment may be allowed solely for the affected service or connection, or can be allowed generally for the cell. In one embodiment, step 524 can be performed by the assessment module 330 and/or the control response module 340.

If in decision step 524 a determination is made that the baseline interference scenario cannot be exceeded, the method proceeds to step 526 where the transmission parameters of the service are modified to achieve the target BER/PER or quality metric without violating the current baseline interference scenario. In an embodiment, this can include changes in modulation and coding, transmit power or any of the other adjustable transmission parameters. In one embodiment, step 526 can be performed by the control response module 340.

According to an embodiment, when parameters are adjusted, there is a possibility that the bandwidth requirements to meet demand can exceed the current available aggregate throughput of the cell. Hence, both parallel paths of the method proceed to decision step 530, where a determination is made as to whether the demand exceeds the current available aggregate throughput. If the current available aggregate throughput of the cell is not exceeded, the method returns to step 501 and can continuously repeat. Otherwise, the method continues to step 540 before continuing to step 501 to repeat. In step 540, a method to mitigate oversubscription is selected and applied. Several methods for mitigating oversubscription are described below. In one embodiment, steps 530 and 540 can be performed by the control response module 340.

According to an embodiment, the method illustrated in FIG. 5 can include an uplink instance and a downlink instance that operate independently, for example in a Frequency Division Duplex (FDD) system. Conversely, in other embodiments, the uplink and downlink instances may need to share information in a Time Division Duplex (TDD) system where the uplink and downlink are on the same frequency and may, therefore, contribute interference in certain situations. This may be especially true of TDD systems that adapt the uplink/downlink ratio dynamically.

According to an embodiment, the optimization module can also implement another method to optimize performance based on historical data to perform anticipated adaptation to reduce potential oversubscription. According to an embodiment, the optimization module can implement this second method, which can be used to update the operator policy 310. A history of interference can be built through sensing and/or through the use of shared metrics received from other network elements (e.g., the core network, BTSs, UEs). The interference data can be grouped by date and/or time in order to build a picture of interference patterns for various time frames. For example, the interference data can be grouped by the time of day, the day of the week, or by marking the data as holiday or non-holiday. The sensing and/or shared metrics can also include traffic metrics for the SFF base station's own cell and/or for neighboring cells. The can also include "update with memory trail off" where weighted averaging, exponential averaging, or some other method is used to give higher importance to more recent data.

Preemptive decisions can be made based on the history of interference that has been built. For example, a determination can be made whether more or less strict CAC, policy, and/or power control may help to reduce the likelihood of oversubscription. In an embodiment, a determination can be made whether trading off likely robustness versus BER/PER.

According to an embodiment, real time monitoring based on the first method described above and illustrated in FIG. 5 can be used in case unexpected usage patterns disrupt the predictive interference method described in the second method. In an embodiment, predictive data can be used for a baseline scenario and the first method can be used for real-time optimization of the system. In another embodiment, predictive data generated using the second method can be used to update the operator policy 310, and the first method can be used to apply the updated policy.

Intelligent Discard

Referring to FIG. 5, intelligent discard can be used as one of the techniques of algorithm step 540 to mitigate oversubscription caused by modification of transmission parameters in step 526 or caused by varying the interference scenario and RAN/RF parameters in step 514. This is the reactive form of intelligent discard. Alternatively, knowledge of available intelligent discard techniques may be used to influence the throughput level target in step 520, the transmission parameter modifications in step 526, and the changes to the interference scenario and RAN/RF parameters in step 514. This is the interactive form of intelligent discard. The interactive form may further be made proactive by using other system information to predict the future oversubscription of bandwidth.

According to an embodiment, intelligent discard can be practiced by any entity of the communications network that performs scheduling. This can include the scheduling of downlink bandwidth by any form of base station including macrocell, picocell, enterprise femtocell, residential femtocell, relays, or any other form of scheduling. Intelligent discard can be performed by any form of device that transmits in the uplink direction, including user devices, both fixed and mobile, and relay devices. In an embodiment, intelligent discard can be performed by a scheduling algorithm that is implemented in the core network, which centrally directs the actions of devices. In another embodiment, intelligent discard can also be predictively performed by an entity, such as a base station, that allocates uplink bandwidth for use by another entity, such as a user device capable of intelligent discard. The base station and the user device can negotiate whether or not the user device has intelligent discard capability or it may be known based on the model identification of the user device. According to an embodiment, this approach where an entity, such as a base station, that allocates bandwidth for use by another entity in the network capable of intelligent discard, can coordinate with the other entity, such as a user device, can be referred to as cooperative intelligent discard.

Reactive Intelligent Discard

In step 530 of FIG. 5, a determination is made whether or not the application layer throughput demand for bandwidth currently exceeds the available aggregate throughput or whether a specific session or connection is exceeding its allocated throughput. For instance, in step 520, throughput level targets can be established for the active connections being serviced by the base station in question. These target levels can be expressed in such quantitative terms as bits per second or bytes per second. In an embodiment, these target levels can include allowances for retransmissions. Based upon the transmission parameters selected in step 526 and the RAN/RF parameters selected in steps 510 and 514, the throughput levels can be translated into required physical layer resources, such as the resource blocks used in 3GPP LTE, QAM symbols, OFDM symbols, subchannels, UL/DL ratio, or combinations thereof. The required physical layer resources can include allowances for HARQ or other retransmissions. Once converted to physical layer resources, the throughput level targets or demand can be compared against available physical layer resources as is indicated in step 530. This comparison may return a result indicting that demand for physical resources currently exceeds available physical resources. In this case, a reduction in physical resource demand is necessary in order to not exceed available physical resources. This in turn determines a necessary reduction in the current demand for bandwidth at the session, connection and/or application.

According to an alternative embodiment, other algorithms can be used to determine whether the demand for physical resource exceeds the available physical resources which can provide an available throughput metric that can be used for reactive intelligent discard.

Once a determination is made that application layer throughput demand exceeds available physical resources, intelligent discard can be used in step 540 to reduce the demand while minimizing the need to curtail individual services and while maximizing the quality perceived by the end user.

For instance, if the demand for resources for a VoIP service exceeds the available physical resources by 10%, random (not intelligent) discard may cause consecutive or near consecutive VoIP packets to be discarded. In contrast, reactive intelligent discard can identify a number packets that can be dropped in order to reduce at least a portion of the excess demand for bandwidth while preserving the perceived quality of the call. For example, in one embodiment, in an intelligent discard system, the scheduler can discard every tenth packet. This could include packets already queued by the scheduler, or packets as they are being queued, or both. The even distribution of discarded packets by the intelligent discard algorithm may be less noticeable to the end user than clumping of discarded packets by a random discard algorithm. According to an embodiment, other patterns can be used to select the packets to be discarded, so long as the selected pattern minimizes the number of consecutive and near consecutive packets that are discarded.

According to an embodiment, the discard algorithm can also be adjusted depending on the specific voice protocol and codec being used. Intelligent discard can allow the call to continue with acceptable quality, as determined by a quality score and compared to the operator, system, or local policy.

In another example, in MPEG-2 transmissions, audio packets are more important than video packets, because humans notice changes in audio quality in MPEG-2 transmissions more readily than they notice changes in video quality. Additionally, the video packets are comprised of intra-coded frames ("I-frames"), predictive-coded frames ("P-frames"), and bidirectionally-predictive-coded frames ("B-frames"). The loss of an I-frame is typically more detrimental to the quality of an MPEG-2 transmission than the loss of a P-frame or B-frame. In fact, the loss of an I-frame can result in the receiving device being unable to use a P-frame, even if the P-frame is received correctly. So, in MPEG-2 intelligent discard may discard P-frames and B-frames preferentially to I-frames and may discard all forms of video frames preferentially to audio frames.

For MPEG-4 transmission, in addition to the distinction between frames inherited from MPEG-2, there are 11 levels of spatial scalability, 3 levels of temporal scalability, and a variable number of levels of quality scalability depending upon the video application. Fine grain scalability combines these into 11 levels of scalability. In an embodiment, "marking" of packets with information can be performed and the markings can be used by intelligent discard to allow a fine grained varying of quality as available physical resources change.

As with the VoIP example, in the MPEG examples, intelligent discard can perform discard of already queued packets as well as discard upon entry to the scheduling queue. The intelligent discard of a percentage of packets can allow more services to be maintained and accepted by the system's call admission control (CAC) algorithms.

In step 540, there may be more than one choice of service that can have intelligent discard applied to meet the physical layer resource constraints. There are numerous criteria that can be used to choose the service or services to which to apply intelligent discard. For instance, intelligent discard can be applied in a round robin fashion, similarly impacting all services or all services within a selected class or set of services. Intelligent discard can be applied based on the identity of the end user or membership of the end user in some group. For instance, different users may pay more or less for different service level agreements with the operator of the network. Users with a lower level agreement may be impacted preferentially to users with a higher level agreement. Users that are roaming from another network may be impacted by intelligent discard preferentially to users that subscribe directly to the network. The decision can be based on service type or application. For instance, a VoIP call being made via a third party application such as Skype may be impacted preferentially to a VoIP call made via a VoIP service directly provided by the operator. Which service to impact can be determined algorithmically to maximize total throughput. The decision on how to apply intelligent discard is based on system, operator, or autonomous policy. For instance, a device may have a default policy which may be modified or overridden by a system or operator policy.

The decision as to which services to impact can be based on relative degradation, impacting first, for example, those service whose observed quality is least impacted by intelligent discard regardless of the relative quantity of discarded data. To facilitate this, step 540 can calculate a score for each of the possible throughput levels for the various services. These scores represent a relative level of observed quality for each throughput level. These scores may be based on subjective criteria, such as MOS scores used to score voice quality, or may be quantitative such as the elimination of a feature from the service. The scores can be used in step 540 as part of the determination of which service will have intelligent discard applied and to what extent. For example, once a set of scores for a set of possible throughput levels for services requiring bandwidth, a target bandwidth level can be selected for one or more of the services based on the set of scores calculated for the various throughput levels, and packets associated with each service can be selectively discarded to reduce the throughput associated with each of the services to the target throughput level associated with that service.

Reactive intelligent discard can be performed in any portion of the system that can make a choice regarding transmission or disposition of a packet. For instance, in one embodiment, a base station, pico station, femto station or relay station can include a transceiver for transmitting and receiving packets. According to a preferred embodiment, these stations can include a medium access control (MAC) layer responsible for allocation of bandwidth on the uplink and/or the downlink. The MAC layer preferably can contain or be associated with a scheduler and buffers for storing packets prior to transmission. In one embodiment, the intelligent discard techniques disclosed herein can be implemented in the portion of the MAC layer responsible for buffering ad scheduling the transmission of packets. Alternatively, the equivalent of the MAC scheduler can reside in a core network element that performs centralized scheduling, and possibly, buffering. For example, in one embodiment, the equivalent of the MAC scheduler could be implemented to coordinate simultaneous transmission of data, such as broadcast video or audio, on two or more base stations or other similar devices.

In an embodiment, the intelligent discard techniques can also be implemented in the MAC scheduler of a user device that schedules and buffers data prior to transmission in the uplink. According to an embodiment, the core network or base station (or equivalent device) can be configured to mark packets prior to buffering to facilitate making easier discard decisions in the downlink direction. Alternatively, a function preceding the buffering of packets for uplink transmission by the user device can mark packets for easier discard decisions by the MAC scheduler function in the user device.

Interactive Intelligent Discard

In addition to the previously described reactive intelligent discard, the intelligent discard algorithm can interact with other aspects of the system control to gain improved performance. For example, referring now to FIG. 5, in one embodiment changing a particular RAN/RF network operating parameter, such as lowering the maximum transmit power in step 510, might benefit neighboring cells by reducing the observed interference of those cells.

Alternatively, choosing a more robust modulation scheme in step 526 can also have a similar effect. In a typical system, these changes could be undesirable due to the resulting decrease in available physical resources, causing the application layer throughput demand to exceed available bandwidth. In contrast, in a system employing interactive intelligent discard, in step 520, a set of throughput levels can be calculated for the active services. The set of throughput levels represents a larger range of physical resource demands when the possible transmission parameter choices of step 526 and possible RAN/RF parameters of step 510 are considered. Knowledge of these possible combinations of quality levels, transmission, and RAN/RF parameters allows the system in steps 510 and 526 to choose parameters that can substantially increase robustness of the system, temporarily or permanently, at the sacrifice of a small amount of quality to one or more services.

Alternative Implementation of Interactive Intelligent Discard

Figure 6:
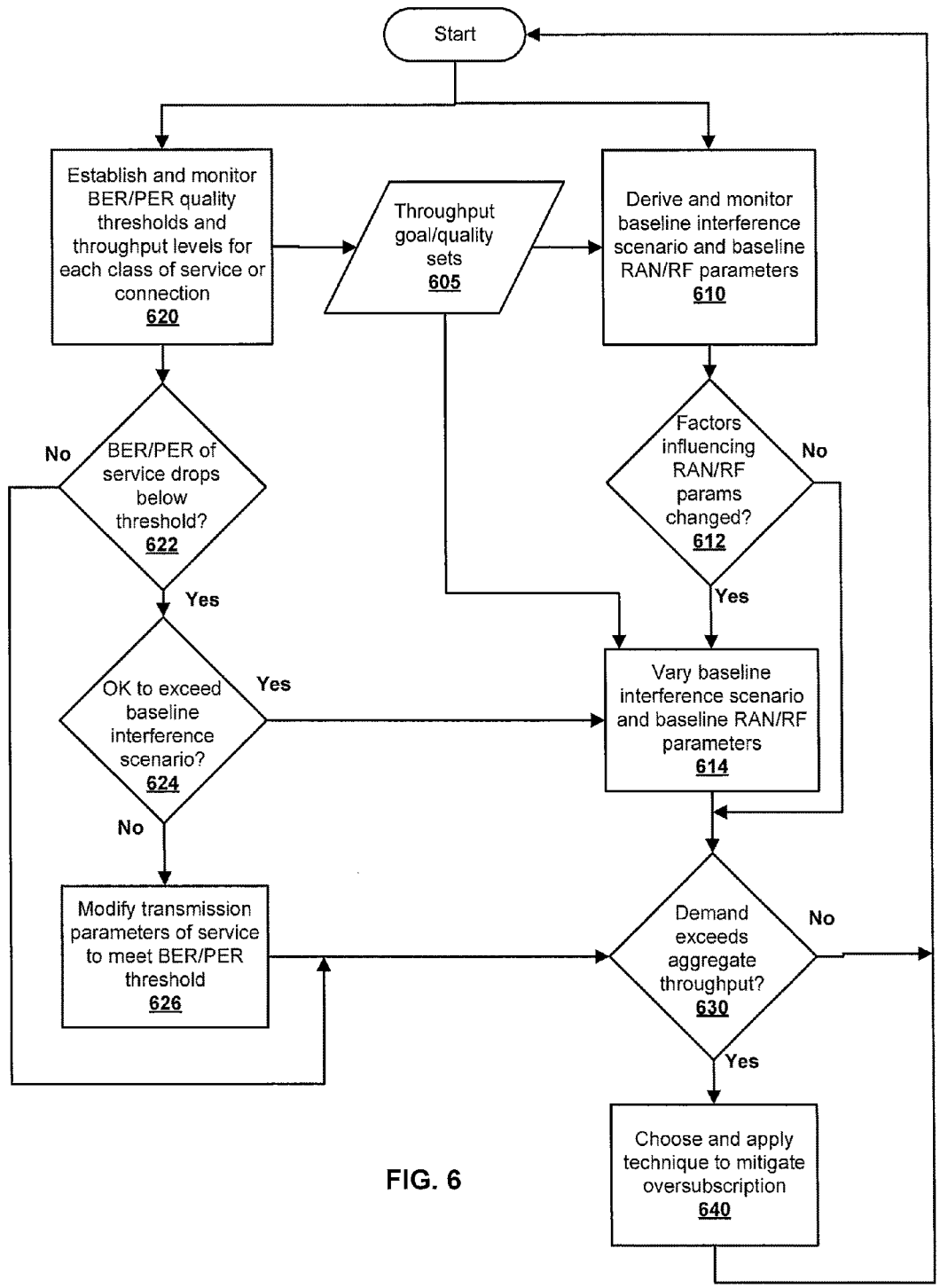
FIG. 6 is a flow diagram of a method for mitigating effects of interference scenarios in a wireless communication network according to an embodiment.

FIG. 6 is a flow diagram of a modified version of the method illustrated in FIG. 5 that enables other aspects of network operation, such as interference mitigation and power control, to make use of intelligent discard to further optimize system performance. In step 620, rather than creating a single quality (e.g., BER or PER) and throughput level for a service or connection (as in step 520 of FIG. 5), a set of throughput levels and/or range of quantitative quality thresholds (e.g., BER and PER) can be created (605). A score can be applied to each of the throughput levels. The score represents a relative level of observed quality for each throughput level. According to an embodiment, a score can be applied to each of the throughput levels to indicate a relative level of observed quality for each throughput level. The scores can be based on subjective criteria, such as MOS scores used to score voice quality, or the scores can be quantitative, such as the elimination of a feature from the service. The scores can be used in step 640 as part of the determination of which server will have intelligent discard applied and to what extent.

The set of throughput levels and scores, exemplified by data block 605, can be used by step 610, decision step 612, and modified step 614 to make tradeoffs between service quality and other system operational factors. Other steps, such as step 626 can also use the set of throughput levels and scores to optimize performance choices. For instance, based on the throughput levels and scores, the method in step 610 can choose to apply a more robust modulation and lower power the baseline parameters for a service, with the knowledge that the performance degradation to the individual service will be small relative to the reduction in interference caused to neighboring cells. In fact, the change in RAN/RF parameters can be a reaction to a request for interference reduction from a neighboring cell, or a command or request for interference reduction or noise floor reduction from a network management entity or other centrally located control function, or an autonomous decision to reduce power, interference potential, or some other aspect of network operation. In this way, step 610 and similar functions can assess the quality impact implied by the throughput impact resulting from potential alternative actions that can be applied to the previously independent task of choosing appropriate RAN/RF parameters.

In a preferred embodiment, an interactive intelligent discard method implements the discard function in the equivalent of the MAC layer scheduler and packet buffering capability prior to transmission by the transceiver of the station, user device, or network function implementing interactive intelligent discard. The derivation of sets of quality thresholds, throughput levels, and scores can be performed by a function that can be implemented in the core network, the base station (macro, pico or femto), or user devices and provides the information to the interactive intelligent discard function which interacts with the buffering and scheduling in the MAC layer to perform intelligent discard. The interactive intelligent discard function can also interact with the physical layer functions, which monitor the RF environment, and interacts with core network functions or functions on other base stations or network elements to exchange information about the RF environments of neighboring cells. A network facing function within interactive intelligent discard can provide information regarding the services, user devices, and RF environment to a core network function or to an interactive intelligent discard function on neighboring devices. The interactive intelligent discard method can provide information to an RF or Physical Layer (PHY) control module, which adjusts the RAN/RF parameters for the transmission of certain information packets.

Proactive Intelligent Discard

According to an embodiment, proactive intelligent discard is a technique for predictively performing intelligent discard in anticipation of oversubscription conditions and for performing the discard before the oversubscription conditions actually occur. Proactive intelligent discard can be used to reduce anticipated demand when the anticipated demand for network bandwidth exceeds anticipated available bandwidth.

Proactive intelligent discard may be applied reactively. For example, expectation of a handover creates expectation of more robust modulation and, therefore, lower throughput per physical layer resource unit as a mobile station approaches the edge of a cell. Proactive intelligent discard can be used to discard ahead of the actual event, allowing smoother handovers with controlled discard of data rather than random loss of data due to congestion.

Proactive intelligent discard can be applied interactively. For instance, it may be known from historical data that interference to or from neighboring cells increases at a certain time of day (daily commute, etc.). In proactive intelligent discard, step 612 can determine that the factors influencing the RAN/RF parameters are about to change, and in step 614 the RAN/RF parameters can be modified based on the assumption that the change will be needed in combination with the set of throughput levels and scores created by step 620 in order to proactively modify the system parameters so that intelligent discard can preserve optimal throughput and quality based on the systems policies regarding quality and throughput.

Proactive intelligent discard may be performed based on a variety of stimuli or trigger events. Some examples of the types of stimuli or trigger events that can be used to trigger the execution of proactive intelligent discard include:

(1) Motion—if it is determined that the device is not stationary or is exceeding some speed threshold, proactive intelligent discard may anticipate the need to perform intelligent discard based on expectations of motion caused changes in physical parameters that impact throughput availability.

(2) Expectation of handover—if it is determined that the likelihood of handover exceeds some threshold metric, intelligent discard can proactively discard data in a controlled fashion so as to minimize the quality impact of predicted decrease in resources.

(3) Time of day, day of week, or other historical patterns—historical data may show that decrease in resources may be expected at predictable points in time. Proactive intelligent discard can prepare the system for smooth transition to lower resources.

(4) Active/inactive user devices in a cell—The number of user devices in a cell may be used to predict fluctuations in demand that would cause reactive intelligent discard to take action.

(5) Reserve resources—proactive intelligent discard can aid in service quality preservation by proactively performing intelligent discard to keep resources in reserve for other functions such as Call Admission Control which may be able to serve more active calls if intelligent discard is applied (6) Changes to Neighbor Cells—information regarding changes in the quantity and configuration of neighboring cells, including but not limited to: number of neighbor cells, location of neighbor cells, Cell Operator, frequency and bandwidth of operation, number of active/idle UEs, RF/RAN parameters.

Additionally, proactive intelligent discard can provide a smoother transition from one level of discard to another, minimizing the impact on quality of service parameters such as jitter and individual packet delay.

In an embodiment, proactive intelligent discard can also be used in an implementation where the discard occurs before being needed, applying a lower throughput in anticipation of lack of resources. In an alternative embodiment, proactive intelligent discard can be used in an implementation where the packets to be dropped during the period of expected lack of resources are tagged for quick discard, but only discarded in the event that the anticipated lack of resources actually occurs.

In an embodiment, the intelligent discard can also perform the inverse role: accelerating packet transmission into the channel before a capacity limitation comes into effect. This may allow the avoidance of a future short-term resource constraint.

The historical or other data that is used to create the patterns or history that is used to proactively implement intelligent discard can come from a variety of sources. For example, RF modules can collect information regarding the physical environment. In another example, the MAC layer can collect information regarding packet demand and throughput, and numbers of active or inactive user devices and services. In one embodiment, the information can be processed locally on a device to convert the inputs into historical trends, or in an alternative embodiment, the information can be forwarded to a function in the core network or any other processor for conversion into historical trends and patterns. The historical trends and patterns can be used locally by a device or may be shared between devices, such as in the case where interactive intelligent discard is applied proactively.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, units, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a unit, module, block or step is for ease of description. Specific functions or steps can be moved from one unit, module or block without departing from the invention.

The various illustrative logical blocks, units, steps and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module (or unit) executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

What is claimed is:

1. A multivariate control system for managing bandwidth capacity in a capacity and spectrum constrained, multiple-access communication network, the system comprising:
   a processor; and
   a memory storing instructions for execution by the processor, the memory comprising:
   a policy parameters module configured to receive policy parameters that define operational requirements for the communication network;
   an environment parameters module configured to receive environment parameters that represent real-time information describing the operating status of the communication network;
   a control set points module in communication with the policy parameters module and configured to receive policy parameters from the policy parameters module and to generate a set of control set points used to assess whether current operating status of the communication network meets the operational requirements defined in the policy parameters;
   a real-time profile module in communication with the environment parameters module and configured to receive environment parameters from the environment parameters module and to generate a real-time profile of the communication network that represents current operating conditions of the communication network;
   an assessment module in communication with the real-time profile module and the control set points module and configured to receive the real-time profile from the real-time profile module and the set of control set points from the control set point module, and to determine whether the current operating conditions of the communication network meet the operational requirements in the policy parameters, and to generate feedback signals indicating that the current operating conditions of the communication network do not meet the operational requirement; and
   a control response module in communication with the assessment module and configured to receive the feedback signals from the assessment module and to generate control signals for one or more components of the communication system to adjust operating parameters of the one or more components of the communication system.

2. The control system of claim 1 wherein the policy parameters comprise quality of service parameters and interference parameters.

3. The control system of claim 1 wherein the policy parameters comprise quality of service parameters.

4. The control system of claim 1 wherein the policy parameters comprise interference parameters.

5. The control system of claim 1 further comprising:
   a patterns module in communication with the real-time profile module, the environment parameters module, and the control response module, the patterns module being configured to receive the real-time profile from the real-time profile module and the environment parameters from the environment parameters module, and to generate patterns that comprise a set of historical quantitative parameter patterns based on the real-time profile and environment parameters.

6. The control system of claim 5 wherein the patterns module is configured to generate feedforward signals based on the patterns, and wherein the control response module is configured to receive the feedforward signals and to generate control signals for one or more components of the communication system to adjust the operating parameters of the one or more components of the communication system.

7. The control system of claim 1 wherein the control system is implemented distributed between a base station and other core network elements.

8. The control system of claim 1 wherein the control system is implemented in user equipment.

9. The control system of claim 1 wherein the control system is implemented in a base station.

10. The control system of claim 9 wherein the base station is a picocell.

11. The control system of claim 9 wherein the base station is a femtocell.

12. The control system of claim 9 wherein the base station is a macrocell.

13. The control system of claim 9 wherein the control response module is configured to generate a control signal to instruct the base station to discard network packets to reduce the demand for bandwidth if the current operating conditions of the communication network do not meet the operational requirements.

14. The control system of claim 13 wherein the assessment module is configured to determine whether an actual error rate exceeds a target error rate threshold, the target error rate being derived from the operating policy and the actual error rate being determined from the real-time profile.

15. The control system of claim 14 wherein if the actual error rate exceeds the target error rate threshold, the assessment module is configured to determine whether the base station can adjust the operating parameters of the base station to exceed a set of baseline interference parameters in order to reduce the actual error rate below the target error rate threshold.

16. The control system of claim 15 wherein the assessment module is configured to generate a feedback signal instructing the control response module to generate a control signal instructing the base station to adjust the transmission parameters to reduce the actual error rate below the target error rate threshold if the base station cannot adjust the operating parameters of the base station to exceed a set of baseline interference parameters.

17. The control system of claim 16 where the assessment module is configured to determine whether current available bandwidth has decreased below current demand for bandwidth as a result of adjusting the transmission parameters, and wherein the assessment module is configured to generate a feedback signal instructing the control response module to generate a control signal instructing the base station to selectively discard packets in order to decrease the current demand for bandwidth.

18. The control system of claim 15 wherein the assessment module is configured to generate a feedback signal instructing the control response module to generate a control signal instructing the base station to modify baseline network operating parameters, if the base station can adjust the operating parameters of the base station to exceed a set of baseline interference parameters.

19. The control system of claim 18, wherein the base station is a first base station of at least two base stations, if the first base station can adjust the operating parameters of the first base station to exceed the set of baseline interference parameters, wherein exceeding the baseline interference pattern causes the throughput of a second base station to decrease, and wherein the second base station is configured to mitigate over subscription caused by modifying the operating parameters of the first base station by selectively discarding packets.

20. The control system of claim 18, wherein if the base station can adjust the operating parameters of the base station to exceed the set of baseline interference parameters, wherein the base station is configured to allocate bandwidth to a device, wherein the device is configured to mitigate oversubscription by selectively discarding packets, wherein the base station is configured to coordinate with the device to selectively discard packets to mitigate oversubscription, and wherein the base station is configured to adjust the operating parameters to exceed the set of baseline interference parameters.

21. The control system of claim 13 wherein the control response module is configured to use reactive intelligent discard to mitigate oversubscription.

22. The control system of claim 21 wherein the control response module is configured to:
identify a level of quality of service importance associated with packets of network traffic; and
selectively discard packets having a lower level of quality of service importance associated with the packets.

23. The control system of claim 22 wherein the control response module is further configured to:
identify a set of services requiring an allocation of bandwidth;
identify services for which selectively discarding packets would result in a least amount of relative degradation of quality of service if the packets were discarded; and
discard packets from the identified services to reduce the demand for bandwidth.

24. The control system of claim 23 wherein the control response module when identifying services for which selectively discarding packets would result in the least amount of relative degradation of quality of service if packets were discarded, is further configured to:
calculate a set of scores for a set of possible throughput levels for each service, each score representing a relative level of observed quality for each throughput level;
select a target throughput level for one or more services based on the set of scores associated with the set of throughput levels associated with each service; and
discard packets associated with the one more services so that a throughput level associated with the service reaches the target throughput level.

25. The control system of claim 13 wherein the control response module is configured to use proactive intelligent discard to mitigate predicted oversubscription.

26. The control system of claim 25 wherein the control response module is configured to discard packets to mitigate potential oversubscription in response to one or more network events that are likely to decrease network throughput.

27. The control system of claim 26 wherein the one or more network events are likely to decrease network throughput due to interference from one or more neighboring base stations or based on interference to the one or more neighboring base stations.

28. The control system of claim 25 wherein executing the proactive intelligent discard method is conditioned on the occurrence of a trigger event.

29. The control system of claim 28 wherein the trigger event for executing the proactive intelligent discard is a determination that a user device is motion and is exceeding a predetermined speed threshold, and wherein the control response module is configured to discard packets associated with the user device in response to the determination.

30. The control system of claim 28 wherein the control system is configured to determine the likelihood that a particular user device will be handed off to another base station; and wherein the control response module is configured to trigger the selective discard of packets associated with the user device if the likelihood that the user device will be handed off to another base station exceeds a predetermined threshold.

31. The control system of claim 28 wherein the discard is triggered at a predetermined date and time.

32. The control system of claim 28 wherein the trigger event comprises identification of a number of active user devices within a cell associated with the base station, and wherein control response module is configure to discard packets if the number of active user devices exceeds a predetermined threshold.

33. The control system of claim 28 wherein the control response module is configured to:
monitor usage and available resources to determine if available resources have fallen below a predetermined threshold; and
if available resources have fallen below a predetermined threshold, trigger selective proactive discard of packets to decrease the usage of resources to increase the available resources in reserve for other services.

34. The control system of claim 28 wherein the trigger event comprises changes to the operating parameters of one or more neighboring cells.

35. The control system of claim 25 wherein the control response module is configured to:
select packets to be discarded in the event that an anticipated shortfall of resources occurs;
tag the selected packets for deletion in the event the shortfall occurs; and
discard the selected packets only if the anticipated shortfall occurs.

36. The control system of claim 21 wherein the control response module is configured to increase a packet transmission rate in an attempt to avoid an anticipated shortfall of resources.

37. A multivariate control system for managing bandwidth capacity in a capacity and spectrum constrained, multiple-access communication network, the system comprising:
a processor; and
a memory storing instructions for execution by the processor, the memory comprising:

an environment parameters module configured to receive environment parameters that represent real-time information describing the operating status of the communication network including current available bandwidth and current demand for bandwidth;

a real-time profile module in communication with the environment parameters module and configured to receive environment parameters from the environment parameters module and to generate a real-time profile of the communication network that represents the current demand for bandwidth and current available bandwidth on the communication network;

an assessment module in communication with the real-time profile module and a control set points module and configured to receive the real-time profile from the real-time profile module and a set of control set points from the control set point module, determine whether the current demand for bandwidth exceeds the current available bandwidth based on the real-time profile, and generate feedback signals indicating that a control response module should discard network packets to mitigate oversubscription based on policy parameters; and the control response module in communication with the assessment module and configured to receive the feedback signals from the assessment module and to selectively discard packets to reduce the current demand for bandwidth.

38. The control system of claim 37 wherein the control response module is configured to:

identify a level of quality of service importance associated with packets of network traffic; and selectively discard packets having a lower level of quality of service importance associated with the packets.

39. The control system of claim 38 wherein the control response module is further configured to:

identify a set of services requiring an allocation of bandwidth;

identify services for which selectively discarding packets would result in a least amount of relative degradation of quality of service if the packets were discarded; and discard packets from the identified services to reduce the demand for bandwidth.

40. The control system of claim 39 wherein the control response module when identifying services for which selectively discarding packets would result in the least amount of relative degradation of quality of service if packets were discarded, is further configured to:

calculate a set of scores for a set of possible throughput levels for each service, each score representing a relative level of observed quality for each throughput level;

select a target throughput level for one or more services based on the set of scores associated with the set of throughput levels associated with each service; and discard packets associated with the one more services so that a throughput level associated with the service reaches the target throughput level.

41. The control system of claim 37 wherein the control response module is configured to use proactive intelligent discard to mitigate predicted oversubscription.

42. The control system of claim 41 wherein the control response module is configured to discard packets to mitigate potential oversubscription in response to one or more network events that are likely to decrease network throughput.

43. The control system of claim 42 wherein the one or more network events are likely to decrease network throughput due to interference from one or more neighboring base stations or based on interference to the one or more neighboring base stations.

44. The control system of claim 41 wherein executing the proactive intelligent discard method is conditioned on the occurrence of a trigger event.

45. The control system of claim 41 wherein the control response module is configured to:

select packets to be discarded in the event that an anticipated shortfall of resources occurs;

tag the selected packets for deletion in the event the shortfall occurs; and discard the selected packets only if the anticipated shortfall occurs.

46. The control system of claim 37 wherein the control response module is configured to increase a packet transmission rate in an attempt to avoid an anticipated shortfall of resources.

* * * * *